(12) United States Patent
Tonkin

(10) Patent No.: US 7,147,228 B2
(45) Date of Patent: Dec. 12, 2006

(54) PRESSURE RELIEF DEVICE

(75) Inventor: Philip Edward Tonkin, Holmfirth (GB)

(73) Assignee: Wabco Automotive UK Limited (GB)

( * ) Notice: Subject to any disclaimer, the term of this patent is extended or adjusted under 35 U.S.C. 154(b) by 0 days.

(21) Appl. No.: 10/332,852

(22) PCT Filed: Jul. 26, 2001

(86) PCT No.: PCT/GB01/03366

§ 371 (c)(1),
(2), (4) Date: Nov. 6, 2003

(87) PCT Pub. No.: WO02/09994

PCT Pub. Date: Feb. 7, 2002

(65) Prior Publication Data

US 2004/0080123 A1    Apr. 29, 2004

(30) Foreign Application Priority Data

Jul. 31, 2000    (GB)    .................... 0018764.1

(51) Int. Cl.
*F16J 15/02* (2006.01)

(52) U.S. Cl. .................. 277/321; 277/630; 277/644; 277/928; 215/230; 215/270; 220/203.12

(58) Field of Classification Search ............ 277/641, 277/644, 928, 321, 917, 630, 318; 215/230, 215/270; 220/203.12, 266, 203.11
See application file for complete search history.

(56) References Cited

U.S. PATENT DOCUMENTS 2,600,714 A * 6/1952 Wenscott et al. .......... 220/298
2,820,569 A * 1/1958 Peterson .................. 220/203.12
2,908,480 A * 10/1959 Hamer ....................... 251/328
4,591,062 A * 5/1986 Sandhaus ..................... 215/230
4,685,578 A * 8/1987 Dunshee ...................... 215/230
4,978,947 A * 12/1990 Finnegan .................... 340/611
4,986,429 A * 1/1991 Singleton, Jr. .............. 215/230
5,152,412 A * 10/1992 Iler ............................ 215/230
5,641,085 A * 6/1997 Lonbardo ................ 220/203.12
5,765,714 A * 6/1998 Nakano et al. ............. 220/619
5,779,772 A    7/1998 Unger et al.
6,253,970 B1 * 7/2001 Kohn et al. ................. 222/397
6,695,319 B1 * 2/2004 Anota et al. ................ 277/628

FOREIGN PATENT DOCUMENTS

| | | | |
|---|---|---|---|
| DE | 4433985 A1 | * | 3/1996 |
| DE | 199 55 898 A1 | | 5/2001 |
| EP | A2 0 234 229 | | 9/1987 |
| JP | 2004-116554 | * | 4/2004 |

OTHER PUBLICATIONS

International Search Report (PCT/ISA/210).

* cited by examiner

*Primary Examiner*—Alison K. Pickard
(74) *Attorney, Agent, or Firm*—Nixon Peabody LLP; Jeffrey L. Costellia

(57) ABSTRACT

A circular seal (19) for the end face of a substantially cylindrical canister, the seal (19) having a substantially rectangular cross-section, and a recess (21) in one side thereof to reduce the area of said cross-section. In use the recessed area (21) of the seal (19) constitutes a weakened portion which will blow out elastically to relieve excess pressure.

9 Claims, 2 Drawing Sheets

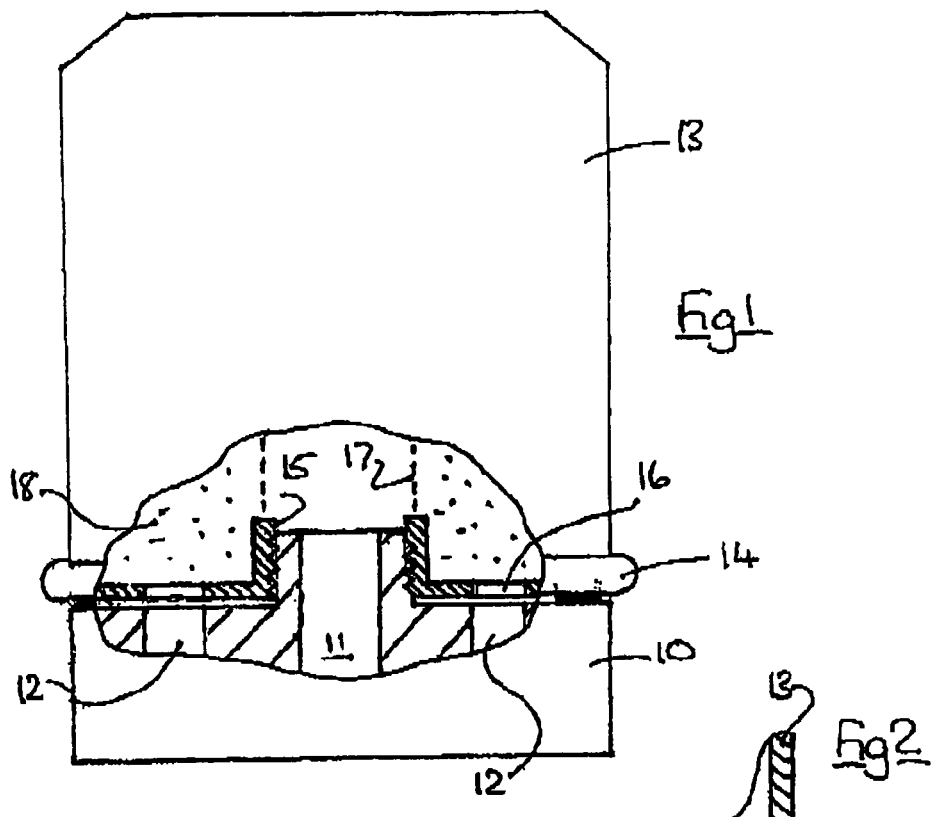
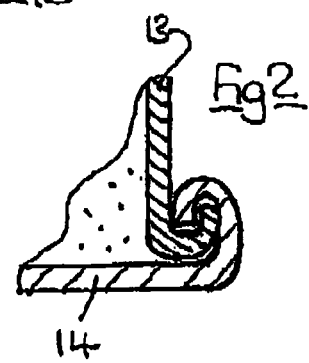
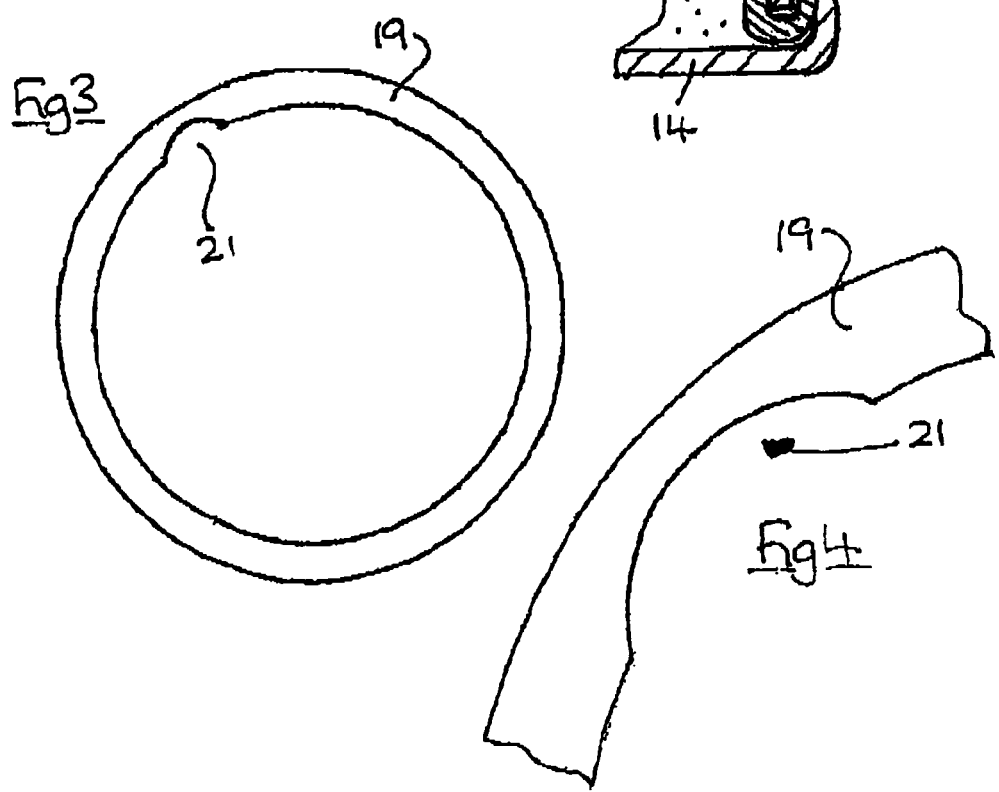
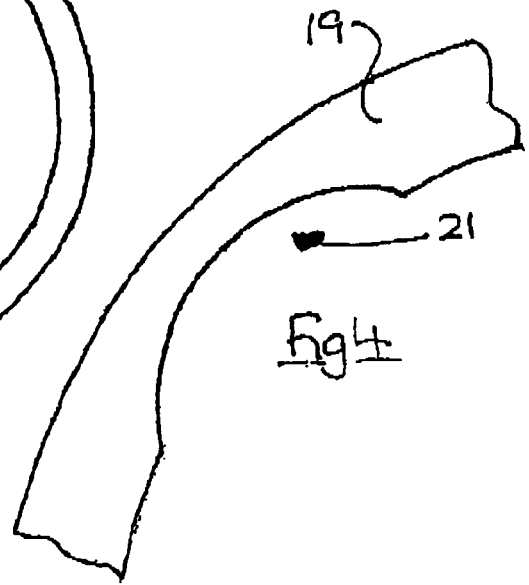

PRESSURE RELIEF DEVICE

This invention relates to a means of relieving excess pressure in an air braking system of a vehicle, and particularly to a means of relieving pressure in the desiccant canister of an air dryer.

Air braking systems of vehicles incorporate an air dryer between the air compressor and the air consumers. This dryer usually comprises a valve block and a replaceable closed canister of desiccant material. Typically the canister consists of a steel pressing in the form of a cup-like body and into which the desiccant is loaded, and an end plate connected to the body by means of a rolled seam. Certain internal partitions may be provided.

Typically, the end plate has concentric inlet and outlet apertures and is attached to valve block by means of a female screw thread. A peripheral elastomeric ring provides the necessary seal between the end plate and the valve block.

The construction of such a container is also well known in relation to replaceable oil filters of vehicles.

Safety devices are provided in the system to ensure that the output pressure of the compressor is restricted to a safe level. Usually the compressor is unloaded by a control mechanism before the safety limit is reached, and a separate pressure relief valve provides a second level of safety protection at a predetermined limit pressure.

There is a very small possibility that the compressor unloader and the pressure relief valve may simultaneously fail to operate, perhaps due to poor maintenance of the system. In these circumstances a rise in pressure may cause a failure of one of the components is the air dryer canister, not least because air pressure acts over a relatively large cross-sectional area, and the forces developed can be rather large. For example a nominal pressure of 12 bar acting on a canister cross-sectional area of 10000 mm$^2$ results in a net force in excess of 1 tonne.

What is required is a means of relieving excess pressure at the desiccant container at a low cost, in a controllable manner and preferably in a way which is re-settable after the excess pressure has been released.

According to the invention, there is provided a circular seal for the end face of a substantially cylindrical canister, the seal having a substantially rectangular cross-section, and a recess in one side thereof to reduce the area of said cross-section.

In use the recessed area of the seal constitutes a weakened portion which will blow out elastically to relieve excess pressure. The seal is preferably adapted to re-seat to permit continued operation of the vehicle, but alternatively the seal can remain in the blown condition as a visual indication of a fault. In the latter case the seal is adapted to be re-seated by slightly unscrewing the canister whereby the inherent resilience of the seal will cause it to adopt the undistorted condition. The canister may then be re-tightened to reinstate the integrity of the air system.

It is envisaged that deformation of the seal during a blow out will reduce slightly the elasticity thereof so that repeated blow-outs will occur at successively lower pressures if the fault is not repaired, and eventually a minimum operating pressure will not be maintained within the system.

Conventionally failure to reach a minimum pressure is indicated to the driver by a cab buzzer or the like.

By permitting the seal to re-seat, or to be reseatable, the vehicle is not immediately disabled, but can continue its depot where a permanent repair may be effected.

Preferably the recess extends radially of the seal, and in the preferred embodiment is provided on the radially inner side of the seal. The recess may reduce the radial wall thickness to 50–80% over a predetermined arc. In one preferred embodiment the recess is in the form of an arc. In an alternative embodiment the recess has a substantially circumferentially extending wall at the base thereof. A recess may be provided both on the inner and on the outer side of the seal. Several recesses may be provided, and may be symmetrical and/or circumferentially aligned. The recess may be provided on an axially facing side of the seal, either wholly or partially; two or more recesses may be provided in order to ensure that the seal is not handed.

In preferred embodiment means are provided to indicate that the seal has blown. Such means may comprise coloured fluid arranged to mark vehicle components in the vicinity of the canister. The fluid is preferably contained in a burstable sac around the seal or in microsacs contained in the seal in the vicinity of the weakened portion(s).

Other features of the invention will be apparent from the following description of a preferred embodiment shown by way of example only in the accompanying drawings in which:

FIG. 1 is a schematic elevation of an air dryer canister and valve block, partially in section.

FIG. 2 is an enlarged scrap section showing a rolled edge connection.

FIG. 3 shows in plan a seal according to the invention;

FIG. 4 shows an enlarged partial plan of the seal of FIG. 3;

Figure 5:
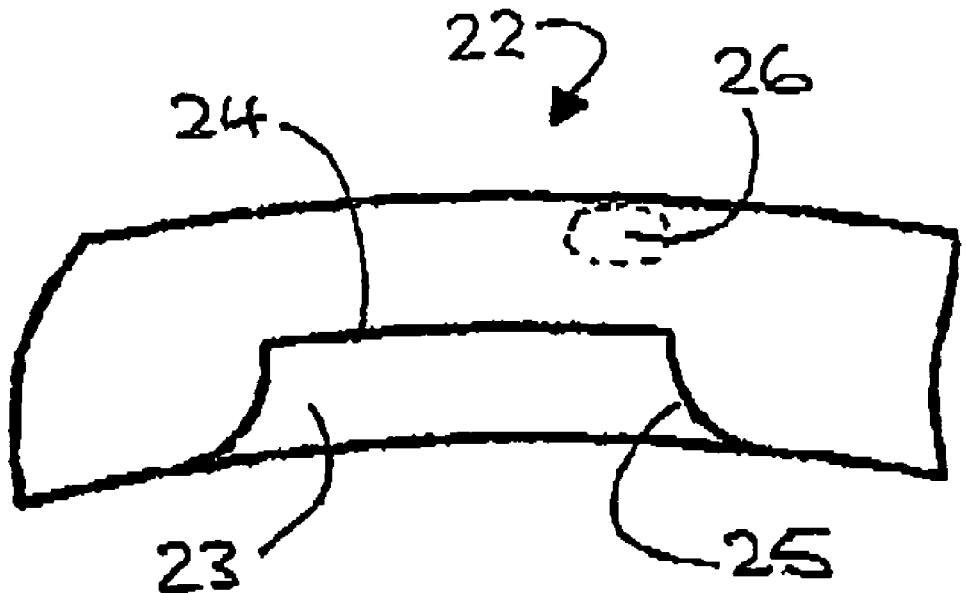
FIG. 5 shows an enlarged partial plan of an alternative seal.
Figure 6:
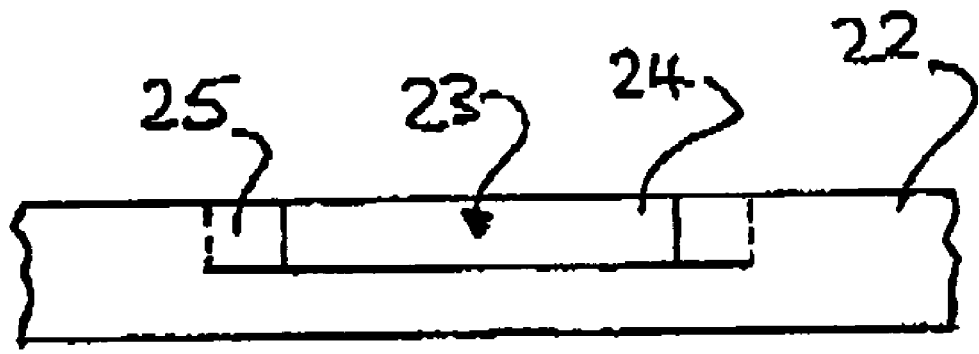
FIG. 6 is an elevation of the seal of FIG. 5 from the inside.

FIG. 1 illustrates a valve block (10) having an inlet passageway (11) and outlet passageways (12). The inlet and outlet passageways may alternatively be reversed. A male threaded connection partially defines the inlet passageway (11).

A replaceable canister comprises a hollow cup-like shell (13) closed by an end plate (14). The shell and plate are rolled at the perimeter, as shown in FIG. 2, to give a leak tight connection. The end plate has a female threaded inlet opening (15), and a plurality of outlet openings (16) for communication with the outlet passageways (12).

Within the canister a perforated cylindrical screen (17) retains an annular charge of desiccant material (18). A circular seal (19) of rectangular cross-section seals the end plate (14) to the valve block (10).

In use the canister is supplied with air under pressure at 7–12 bar, the air being dried as it passes through the desiccant material (18) to the outlet passageway (12). There is no significant pressure drop through the material (18), and accordingly the threaded connection is sufficient to separate inlet and outlet flow. The external seal (19) is however essential to maintain the connection between canister and the valve block leak free.

A portion of the circumference of the seal (19) is relieved, as illustrated by the arcuate recess (21) of FIGS. 3 and 4. This weakened portion is adapted to relieve excess pressure within the canister by distortion, in use the weakened portion allowing excess pressure to vent to the exterior. By careful design, the inherent resilience of the seal is arranged to permit re-seating of the seal by manually unscrewing the canister to a small degree and re-tightening, thus permitting continued safe operation of the braking system. In the event that the seal does not re-seat, the usual low pressure warning signal will alert the vehicle driver that insufficient pressure is available for brake operation.

The seal may be provided with a special peripheral form to ensure location on the valve body in a predetermined orientation. This arrangement ensures that high pressure venting can be arranged in a safe direction, and/or that release of an indicator, dye or the like can be in a preferred direction.

FIG. 5 illustrates an alternative embodiment comprising a circular rectangular section seal 22 having a half depth recess 23 on the upper side as viewed. The recess has a circular inner face 24 terminating at either end in a substantially right angled corner with a convex blending surface 25. The seal is for example 113 mm in diameter and the recess extends for less than 10% of the circumference. Several such recesses may be provided around the periphery of the seal at equal spacing, and recesses may be provided in both the upper and lower surfaces as viewed.

FIG. 5 also illustrates somewhat schematically a microsac 26 incorporated in the seal 22 in the vicinity of the recess, and adapted to burst on significant deformation of the seal as may occur during unseating thereof. The microsac 26 contains a coloured fluid which may spray or drip over adjacent components in order to indicate that the seal has blown.

The invention claimed is:

1. A circular elastomeric seal for the end face of a substantially cylindrical canister, the seal having a substantially rectangular cross-section, and a recess in one side thereof to reduce the area of said cross-section, thereby to provide a weakened portion susceptible of radial deformation in the event of a predetermined radial pressure differential, further including a sac of coloured fluid, said sac being in the vicinity of said recess and burstable on deformation of said weakened portion.

2. A seal according to claim 1 wherein the recess is in an inner face of the seal.

3. A seal according to claim 1 wherein the recess is in a circumferentially extending face of the seal.

4. A seal according to claim 1 wherein the recess is in an axially facing side of said seal.

5. A seal according to claim 1 wherein said recess is arcuate.

6. A seal according to claim 1 wherein said recess has a circumferentially extending wall.

7. A seal according to claim 1 wherein said recess comprises less than 25% of the cross-sectional area of said seal.

8. A seal according to claim 1 wherein said recess has a depth less than 50% of the thickness of said seal in one of the radial and axial directions.

9. A seal according to claim 1 wherein said sac is within said rectangular cross section.

* * * * *